(12) United States Patent
Wang et al.

(10) Patent No.: US 12,381,307 B2
(45) Date of Patent: Aug. 5, 2025

(54) MOUNTING ASSEMBLY AND METHOD OF USE THEREOF

(71) Applicant: Outdoor Wireless Networks LLC, Richardson, TX (US)

(72) Inventors: Shida Wang, Suzhou (CN); Nengbin Liu, Suzhou (CN); Xiwei Yang, Suzhou (CN); Ruixin Su, Suzhou (CN); Puliang Tang, Suzhou (CN)

(73) Assignee: OUTDOOR WIRELESS NETWORKS LLC, Richardson, TX (US)

( * ) Notice: Subject to any disclaimer, the term of this patent is extended or adjusted under 35 U.S.C. 154(b) by 0 days.

(21) Appl. No.: 17/822,255

(22) Filed: Aug. 25, 2022

(65) Prior Publication Data
US 2023/0098517 A1 Mar. 30, 2023

(30) Foreign Application Priority Data
Sep. 24, 2021 (CN) .......................... 202111118725.7

(51) Int. Cl.
*H01Q 1/12* (2006.01)
*F16M 13/02* (2006.01)

(52) U.S. Cl.
CPC ........ *H01Q 1/1207* (2013.01); *F16M 13/022* (2013.01); *H01Q 1/1242* (2013.01)

(58) Field of Classification Search
CPC ... H01Q 1/1207; H01Q 1/1242; F16M 13/022
USPC .......................... 248/519, 515, 536, 540, 541
See application file for complete search history.

(56) References Cited

U.S. PATENT DOCUMENTS

| | | | | |
|---|---|---|---|---|
| 3,318,561 A | * | 5/1967 | Finke | H01Q 1/1228 343/890 |
| 5,954,305 A | * | 9/1999 | Calabro | H01Q 1/1242 343/890 |
| 6,710,751 B2 | * | 3/2004 | Lanello | H01Q 1/1242 343/890 |
| 2011/0279347 A1 | * | 11/2011 | Pass | E04G 3/243 343/890 |

(Continued)

*Primary Examiner* — Muhammad Ijaz
(74) *Attorney, Agent, or Firm* — Myers Bigel, P.A.

(57) ABSTRACT

The present disclosure relates to a mounting assembly and the method of use thereof. The mounting assembly is configured to mount a plurality of objects on a single pole at a predetermined included angle and includes: a clamping mechanism, which fixes the mounting assembly on the pole by clamping the pole; an angle control mechanism, which has a polygonal configuration and controls the included angle between the plurality of objects through its polygonal configuration; and a mounting mechanism, which respectively mounts the plurality of objects by mounting each object among the plurality of objects in a manner where it corresponds to one edge among the plurality of edges of the angle control mechanism, thereby mounting the plurality of objects on the pole at a predetermined included angle. The mounting assembly according to the present disclosure is capable of mounting a plurality of objects on the pole at an accurate included angle in a controlled manner with the angle control mechanism thereof, and according to the mounting assembly of the present disclosure, make the disassembly and removal of the plurality of objects easy by shifting the operation space for fastening to the space between the plurality of objects.

16 Claims, 6 Drawing Sheets

(56) References Cited

U.S. PATENT DOCUMENTS

2016/0211569 A1\* 7/2016 Skrepcinski ......... H01Q 1/1228
2020/0123790 A1\* 4/2020 de La Soujeole ........ E04G 5/08
2020/0321679 A1\* 10/2020 Liu ...................... H01Q 1/1228
2021/0376444 A1\* 12/2021 Heath ..................... E04G 5/045

\* cited by examiner

MOUNTING ASSEMBLY AND METHOD OF USE THEREOF

RELATED APPLICATION

The present application claims priority to and the benefit of Chinese Patent Application No. 202111118725.7, filed Sep. 24, 2021, the disclosure of which is hereby incorporated herein by reference in full.

FIELD OF THE INVENTION

The present disclosure relates to the field of wireless communication technology in general. In particular, the present disclosure relates to a mounting assembly for mounting a plurality of base station antennas on a single pole and the method of use thereof.

BACKGROUND OF THE INVENTION

At present, it is common to mount a plurality of base station antennas on a single rod or pole. Out of aesthetic considerations, an outer cover is usually used to cover the plurality of base station antennas mounted on the single pole, so that the plurality of base station antennas cannot be observed from the outside. However, the limited internal space of the outer cover poses a challenge to mounting the plurality of base station antennas on the single pole while occupying a relatively small space.

Figure 1:
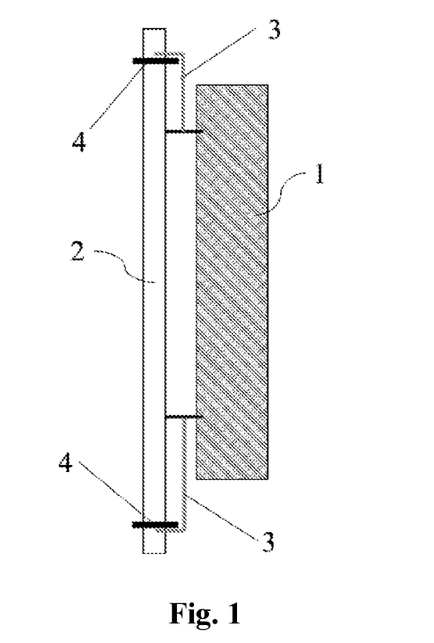
FIG. 1 is a schematic diagram of a mounting assembly for mounting a base station antenna on a pole according to prior art.

Typically, as shown in FIG. 1, to mount each base station antenna 1 on the pole 2, a plurality of extension members 3 and a plurality of mounting members 4 that match the plurality of extension members 3 and are respectively mounted on an upper part and lower part of the base station antenna 1 are used. This brings a series of shortcomings. For example, extension members 3 are usually very heavy, which increases the mounting difficulty of base station antennas. Extension members 3 may be deformed with the heavy load of the entire base station antenna 1, which can make it difficult to guarantee the mounting angle of the base station antenna. In addition, the typical mounting method may not flexible enough for different pole and antenna configurations. For example, when the diameter of the pole 2 changes, the extension member 3 and/or mounting member 4 usually needs to be re-designed. Further, limited by the internal space of the outer cover, the mounting space of the plurality of base station antenna is always very small, which makes the mounting of the plurality of base station antennas according to the traditional mounting method difficult.

SUMMARY OF THE INVENTION

One of the objectives of the present disclosure is to overcome at least one shortcoming in the prior art.

A first aspect of the present disclosure provides a mounting assembly. The mounting assembly is configured to mount a plurality of objects on a single pole at a predetermined included angle and includes: a clamping mechanism, which fixes the mounting assembly on the pole by clamping the pole; an angle control mechanism, which has a polygonal configuration defined by a plurality of edges, wherein the angle control mechanism controls an included angle between the plurality of objects through its polygonal configuration; and a mounting mechanism, which respectively mounts the plurality of objects by mounting each object among the plurality of objects in a manner where it corresponds to one edge among the plurality of edges of the angle control mechanism, thereby mounting the plurality of objects on the pole at a predetermined included angle.

According to an embodiment of the present disclosure, the clamping mechanism includes a plurality of clamping elements which fix the clamping mechanism on the pole by clamping to the pole between them.

According to an embodiment of the present disclosure, the clamping mechanism formed by the plurality of clamping elements is adjustable such that the clamping mechanism is capable of clamping to poles of different diameters.

According to an embodiment of the present disclosure, the plurality of clamping elements have the same structure.

According to an embodiment of the present disclosure, each clamping element includes a first branch, a second branch, and a third branch, in which, the second branch and third branch are configured to be mirror images of each other from one end of the first branch and extend outward while forming an angle such that each clamping element is generally in a "Y" shape.

According to an embodiment of the present disclosure, each one of the second branch and the third branch of each clamping element includes a vertically extending bearing surface compatible for contact with the pole.

According to an embodiment of the present disclosure, each one of the second branch and the third branch of each clamping element further includes a vertically extending connection surface and in which the connection surface of each clamping element is compatible for connecting to the connection surface of another clamping element with a first fastening member, so as to connect two clamping elements together.

According to an embodiment of the present disclosure, the first branch of each clamping element includes a horizontal surface, which is configured for underlying the angle control mechanism.

According to an embodiment of the present disclosure, the horizontal surface of the first branch of each clamping element includes a slot for accommodating a second fastening member to fix the angle control mechanism on the clamping mechanism, and the slot has a length that extends along the extension direction of the first branch.

According to an embodiment of the present disclosure, the angle control mechanism has an equilateral triangle, regular quadrilateral, regular pentagon, regular hexagon, or irregular polygonal shape.

According to an embodiment of the present disclosure, the angle control mechanism includes a plurality of angle control elements.

According to an embodiment of the present disclosure, the plurality of angle control elements have the same structure.

According to an embodiment of the present disclosure, each angle control element includes a generally triangular main body, a first leg and a second leg that are mirror images of each other from two corners of the main body and extend outward while forming an angle.

According to an embodiment of the present disclosure, a free end of the first leg of each angle control element is provided with an insertion part extending perpendicularly to the first leg, and a free end of the second leg of each angle control element is provided with an opening part compatible for accommodating the insertion part of the first leg of another angle control element.

According to an embodiment of the present disclosure, the opening part is in a horizontal plane, and at a different height from the second leg.

According to an embodiment of the present disclosure, a free end of the first leg of each angle control element is further provided with a stop for limiting the distance of insertion of the insertion part into the opening part.

According to an embodiment of the present disclosure, the mounting mechanism includes a plurality of mounting elements.

According to an embodiment of the present disclosure, the plurality of mounting elements have the same structure.

According to an embodiment of the present disclosure, each mounting element includes a horizontally extending part and vertically extending part, and in which the horizontally extending part is configured to overlie the angle control mechanism, and the vertically extending part is configured for fixing the object.

According to an embodiment of the present disclosure, the horizontally extending part includes a middle section and a first extending section and second extending section located at the left and right sides of the middle section, where the middle section of the horizontally extending part is connected to the vertically extending part, and the first extending section and second extending section of the horizontally extending part extend beyond the vertically extending part along a horizontal direction.

According to an embodiment of the present disclosure, when the horizontally extending part of the mounting element is placed on the angle control mechanism, the vertically extending part of the mounting element is aligned to one edge among the plurality of edges of the angle control mechanism and depends from the one edge.

According to an embodiment of the present disclosure, the angle control mechanism and mounting mechanism are fastened together with a fastening component.

According to an embodiment of the present disclosure, the fastening component is a bolt and nut component, the angle control mechanism and mounting mechanism are respectively provided with through holes for accommodating the fastening component, and the through holes are respectively provided on the angle control mechanism and mounting mechanism near the corner away from the mounting location of the object.

According to an embodiment of the present disclosure, the angle control mechanism and mounting mechanism are respectively provided with latch members that match each other, where the buckle members are respectively provided on the angle control mechanism and mounting mechanism near the corner away from the mounting location of the object.

According to an embodiment of the present disclosure, the object is a base station antenna.

According to a second aspect of the present disclosure, a method for mounting a plurality of objects on a single pole at a predetermined included angle using the mounting assembly of the present disclosure is provided, including: i) pre-clamping the clamping mechanism of the mounting assembly on the pole with a first clamping force; ii) placing and fastening the angle control mechanism of the mounting assembly on the clamping mechanism; iii) fixing each object on the mounting mechanism; and iv) placing the mounting mechanism fixed with the object on the angle control mechanism in a manner where it corresponds to the corresponding edge of the angle control mechanism.

According to an embodiment of the present disclosure, in step ii), the angle control mechanism and the clamping mechanism are aligned through a predetermined method by adjusting the location of the clamping mechanism.

According to an embodiment of the present disclosure, after the clamping mechanism is adjusted and in place, the clamping mechanism is further fastened such that the clamping mechanism clamps the pole with a second clamping force larger than the first clamping force.

According to an embodiment of the present disclosure, in step iv), while the mounting mechanism fixed with the object is placed on the angle control mechanism, the mounting mechanism and angle control mechanism are snap-fit together.

According to an embodiment of the present disclosure, in step iv), after placing the mounting mechanism fixed with the object on the angle control mechanism, the fastening component is used to fasten the mounting mechanism and the angle control mechanism together.

It should be noted that various aspects of the present disclosure described for one embodiment may be included in other different embodiments, even though specific description is not made for the other different embodiments. In other words, all the embodiments and/or features of any embodiment may be combined in any manner and/or combination, as long as they are not contradictory to each other.

DESCRIPTION OF DRAWINGS

A plurality of aspects of the present disclosure will be better understood after reading the following specific embodiments with reference to the attached drawings. Among the attached drawings.

It should be understood that in all the attached drawings, the same symbols denote the same elements. In the attached drawings, for clarity, the size of certain feature is not drawn to scale as it may change.

EMBODIMENTS OF THE INVENTION

The present disclosure will be described below with reference to the attached drawings, and the attached drawings illustrate certain embodiments of the present disclosure.

However, it should be understood that the present disclosure may be presented in many different ways and is not limited to the embodiments described below; in fact, the embodiments described below are intended to make the content of the present disclosure more complete and to fully explain the protection scope of the present disclosure to those of ordinary skill in the art. It should also be understood that the embodiments disclosed in the present disclosure may be combined in various ways so as to provide more additional embodiments.

It should be understood that the words in the Specification are only used to describe specific embodiments and are not intended to limit the present disclosure. Unless otherwise defined, all terms (including technical terms and scientific terms) used in the Specification have the meanings commonly understood by those of ordinary skill in the art. For brevity and/or clarity, well-known functions or structures may not be further described in detail.

The singular forms "a," "an," "the" and "this" used in the Specification all include plural forms unless clearly indicated. The words "include," "contain" and "have" used in the Specification indicate the presence of the claimed features, but do not exclude the presence of one or a plurality of other features. The word "and/or" used in the Specification includes any or all combinations of one or a plurality of the related listed items.

In the Specification, when it is described that an element is "on" another element, "attached" to another element, "connected" to another element, "coupled" with another element, or "in contact with" another element, etc., the element may be directly on another element, attached to another element, connected to another element, coupled with another element, or in contact with another element, or an intermediate element may be present.

In the Specification, the terms "first," "second," "third," etc. are only used for convenience of description and are not intended for limitation. Any technical features represented by "first," "second," "third," etc. are interchangeable.

In the Specification, terms expressing spatial relations such as "upper," "lower," "front," "rear," "top," and "bottom" may describe the relation between one feature and another feature in the attached drawings. It should be understood that, in addition to the locations shown in the attached drawings, the words expressing spatial relations further include different locations of a device in use or operation. For example, when a device in the attached drawings is turned upside down, the features originally described as being "below" other features now can be described as being "above" the other features." The device may also be oriented by other means (rotated by 90 degrees or at other locations), and at this time, a relative spatial relation will be explained accordingly.

Figure 2:
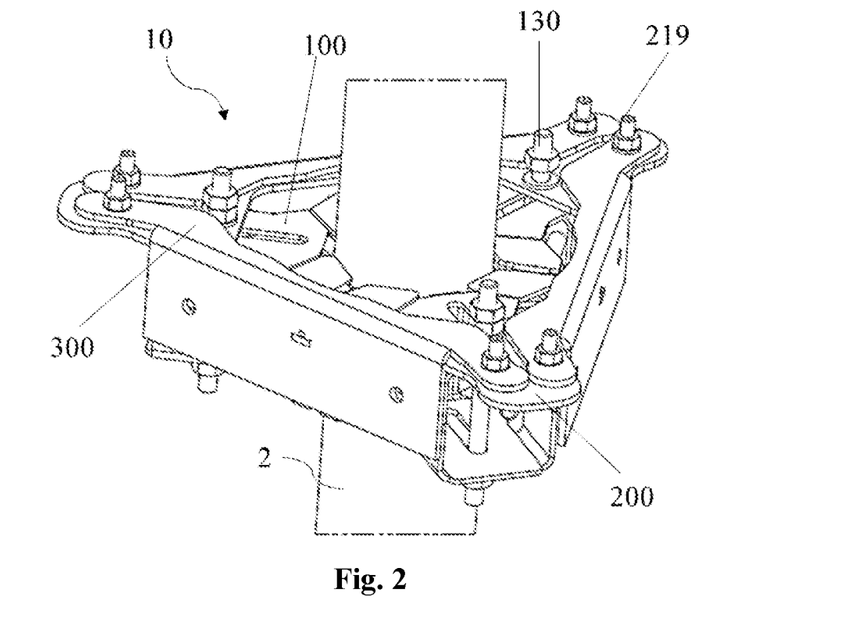
FIG. 2 is a schematic perspective view of a mounting assembly for mounting a plurality of base station antennas on a single pole according to an embodiment of the present disclosure.

A mounting assembly 10 according to an embodiment of the present disclosure is shown with reference to FIG. 2. The mounting assembly 10 is configured to mount a plurality (for example, two, three, four or more) base station antennas 1 on a single pole 2 at a predetermined included angle. The mounting assembly 10 may include: a clamping mechanism 100, which is configured to fix the mounting assembly 10 on the pole 2 by clamping the pole 2; an angle control mechanism 200, which is configured to control the included angle between the plurality of base station antennas 1; and a mounting mechanism 300, which is configured to mount the plurality of base station antennas 1 on the mounting assembly 10 at a predetermined included angle by cooperating with the angle control mechanism 200, thereby fixing the plurality of base station antennas 1 on the pole 2 at a predetermined included angle.

Figure 3:
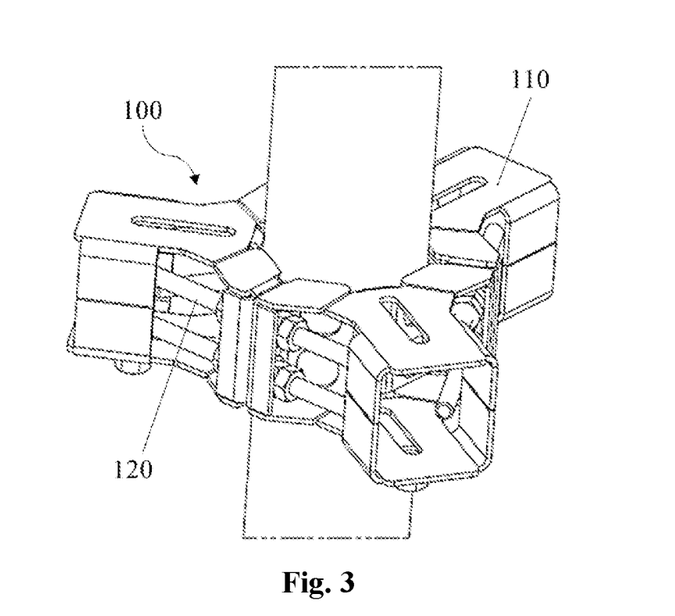
FIG. 3 is a schematic perspective view of a clamping mechanism of the mounting assembly shown in FIG. 2.

The clamping mechanism 100 according to an embodiment of the present disclosure is shown with reference to FIG. 3. The clamping mechanism 100 may include a plurality of clamping elements 110, which are configured to fasten the clamping mechanism 100 on the pole 2 by clamping the pole 2 between them. For example, the plurality of clamping elements 110 may be connected to each other and clamp the pole 2 between them through a fastening member 120 (for example, a bolt and nut component, threaded rod, or other suitable fasteners). The degree of fastening of the fastening member 120 may be adjusted to adjust the clamping force of the clamping mechanism 100 on the pole 2 so as to ensure that the plurality of base station antennas 1 may be securely fixed on the pole 2. In the embodiment shown in FIG. 3, the clamping mechanism 100 includes three clamping elements 110. However, the present disclosure is not limited thereto. The clamping mechanism 100 may also include two, four, five or more clamping elements 110. According to an embodiment of the present disclosure, each of the plurality of clamping elements 110 may have the same structure such that clamping elements 110 may be manufactured by batch, thereby reducing manufacturing cost; this allows for the easy replacement of one or a plurality of clamping elements 110 in the clamping mechanism 100 in the event of damage without having to discard the entire clamping mechanism 100, thereby saving material costs. Using all of the same clamping elements can also facilitate mounting, as the technician need not sort through the clamping elements to find the correct element to use.

Figure 4:
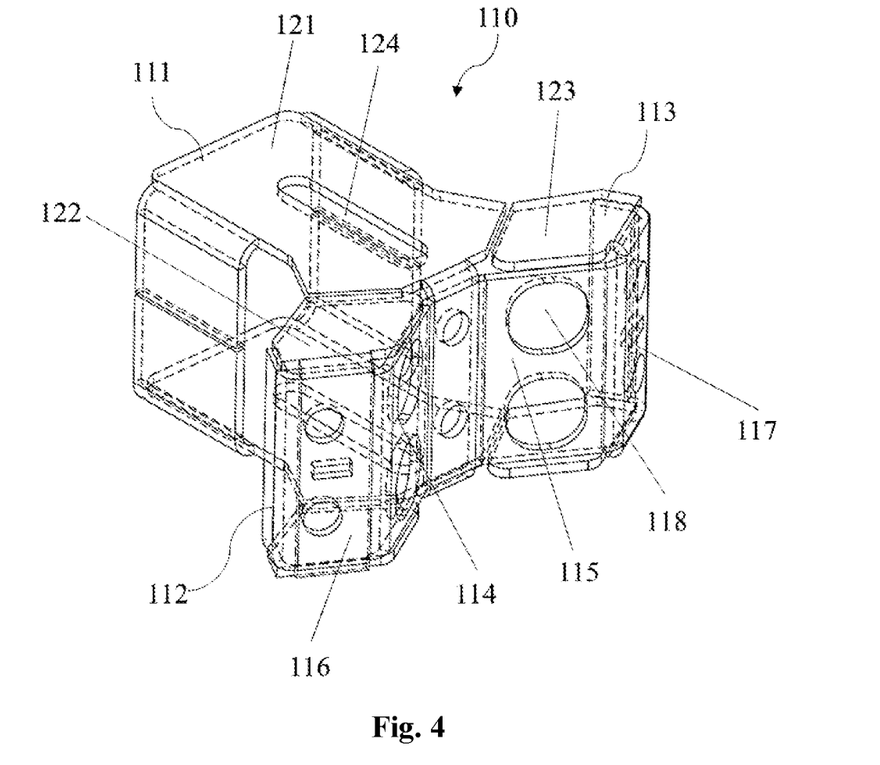
FIG. 4 is a schematic perspective view of a single clamping element of the clamping mechanism shown in FIG. 3.

FIG. 4 shows the specific structure of a clamping element 110 according to an embodiment of the present disclosure. In the embodiment shown in FIG. 4, the clamping element 110 is generally Y-shaped and configured to include a first branch 111, a second branch 112, and a third branch 113, in which the second branch 112 and third branch 113 may be configured to be mirror images of each other from one end of the first branch 111 and extend outward. The second branch 112 and third branch 113 respectively include bearing surfaces 114 and 115 compatible for contact with the pole 2. The bearing surfaces 114 and 115 may be configured to extend vertically. The clamping mechanism 100 may be fastened onto the pole 2 through contact between the bearing surfaces 114 and 115 and the pole 2. The second branch 112 and third branch 113 may further include connection surfaces 116 and 117. Connection surfaces 116 and 117 may be configured to extend vertically. The connection surface of one of the branches among the second branch and third branch of a clamping element 110 may be connected to the connection surface of one of the branches among the second branch and third branch of another clamping element 110 through a fastening member 120 (for example, a bolt and nut component or other suitable fasteners), thereby connecting these two clamping elements 110 together. Each connection surface 116, 117 may be provided with at least one through hole 118 for accommodating the fastening member 120.

Figure 5A:
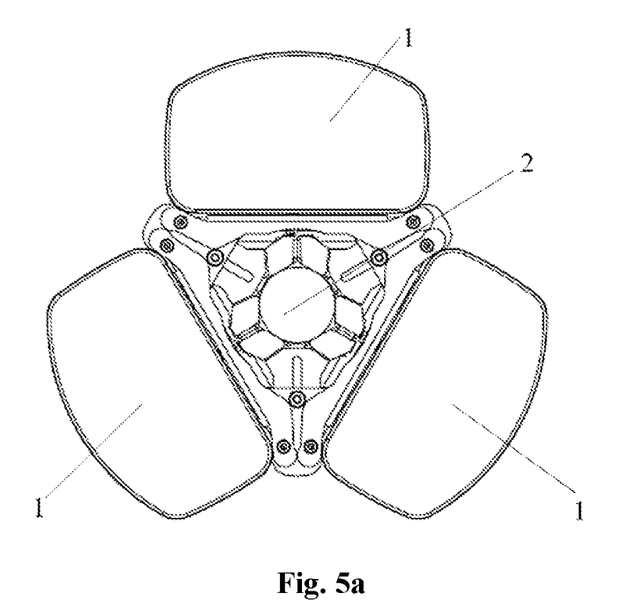
FIG. 5a and FIG. 5b are schematic perspective views of the clamping mechanism shown in FIG. 3 when clamping poles of different diameters.
Figure 5B:
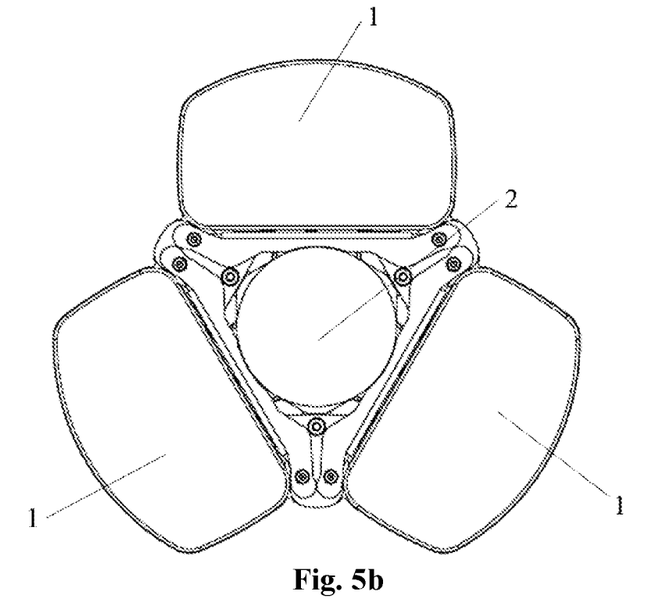

When a plurality of clamping elements 110 are clamped on the pole 2, based on the diameter of the pole 2, the two connection surfaces 116, 117 of the plurality of clamping elements 110 that are facing each other may or may not be in contact. For example, where the diameter of the pole 2 is relatively small (as shown in FIG. 5*a*), the two connection surfaces of the plurality of clamping elements 110 that face each other may be in contact with each other such that the clamping mechanism 100 formed by the plurality of clamping elements 110 has a relatively small internal space. In this case, the bearing surfaces 114 and 115 of the clamping element 110 must be ensured to abut the pole 2 and exert a clamping force on the pole 2 to fasten the clamping mechanism 100 on the pole 2. When the diameter of the pole 2 is relatively large (as shown in FIG. 5b), the two connection surfaces 116, 117 of the plurality of clamping elements 110 that face each other may be not in contact such that the clamping mechanism 100 formed by the plurality of clamping elements 110 has a relatively large internal space to clamp poles 2 with a larger diameter. In other words, according to the embodiments of the present disclosure, the clamping mechanism 100 formed by the plurality of clamping elements 110 is adjustable such that it is capable of clamping poles 2 of different diameters. As a result, the clamping mechanism 100 does not have to be designed differently for poles 2 of different diameters, thereby greatly increasing the flexibility and versatility of the clamping assembly 10 according to the present disclosure.

Figure 6:
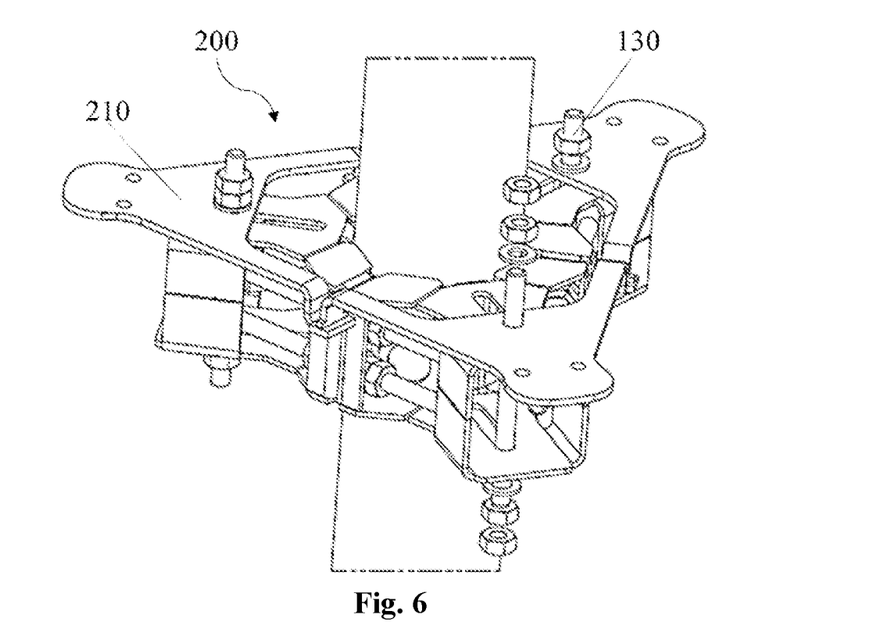
FIG. 6 is a schematic perspective view of an angle control mechanism of the mounting assembly shown in FIG. 2.

According to an embodiment of the present disclosure, as shown in FIG. 4, the first branch 111, second branch 112 and third branch 113 of each clamping element 110 may further include horizontal surfaces 121, 122 and 123. Horizontal surfaces 121, 122 and 123 may be at the same height. The angle control mechanism 200 may be placed on at least one part of horizontal surfaces 121, 122 and 123 (as shown in FIG. 6). The horizontal surface 121 of the first branch 111 is provided with a slot 124 for accommodating a fastening member 130 (for example, a bolt and nut component or other suitable fasteners) to fix the angle control mechanism 200 on the clamping mechanism 100. The slot 124 has a length extending along the extension direction of the first branch 111 such that the location of the fastening member in the slot 124 is adjustable. As a result, when the mounting assembly 10 of the present disclosure is used for poles 2 of different diameters, the angle control mechanism 200 is capable of being adjustably fixed onto the clamping mechanism 100.

According to other embodiments of the present disclosure, clamping elements 110 may have other different structures, as long as they are capable of clamping the pole 2 between them and have a horizontal surface compatible for placing the angle control mechanism 200.

Figure 7:
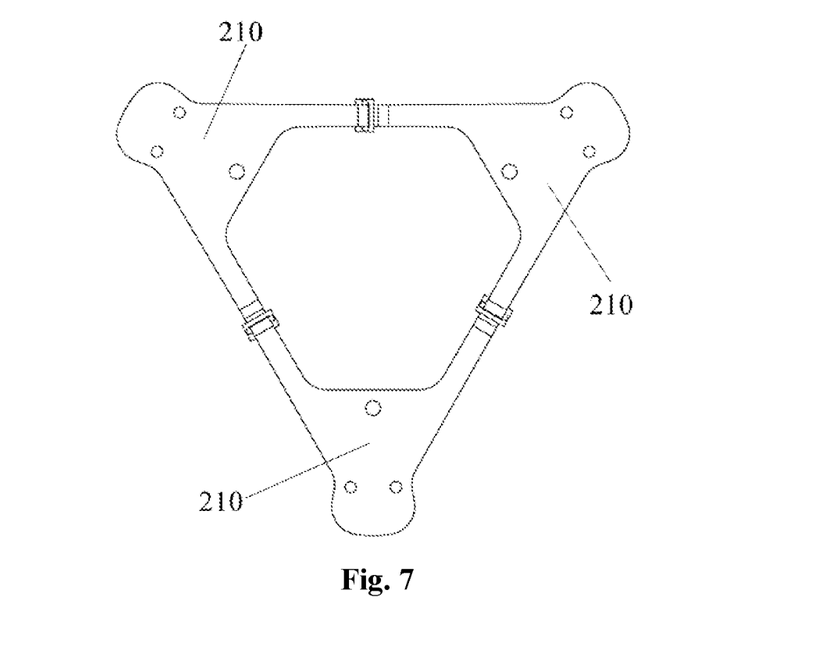
FIG. 7 is a schematic top view of the angle control mechanism shown in FIG. 6.

The angle control mechanism 200 according to an embodiment of the present disclosure is shown with reference to FIG. 6 and FIG. 7. The angle control mechanism 200 may be configured to have a polygonal shape when fully assembled. The polygonal configuration of the angle control mechanism 200 may be selected to control the included angle between the plurality of base station antennas 1. According to the embodiments shown in FIG. 6 and FIG. 7, the angle control mechanism 200 is substantially an equilateral triangle and the location of each side is compatible for mounting a base station antenna 1 and is thereby capable of ensuring that the included angle between each base station antenna 1 and adjacent base station antenna 1 is 120°. According to other embodiments according to the present disclosure, the angle control mechanism 200 may also be substantially a regular quadrilateral (e.g., a square), regular pentagon, regular hexagon, etc. and the location of each side is compatible for mounting a base station antenna 1 and is thereby capable of ensuring that the included angle between each base station antenna 1 and adjacent base station antenna 1 is 180°, 90°, 72° or 60°. The angle control mechanism 200 may further have other irregular polygonal shapes such that the included angle between the plurality of mounted base station antennas 1 are different in a controlled manner.

According to an embodiment of the present disclosure, the angle control mechanism 200 may include a plurality of angle control elements 210, which may be connected to each other to form the angle control mechanism 200. In the embodiments shown in FIG. 6 and FIG. 7, the angle control mechanism 200 includes three angle control elements 210. However, the present disclosure is not limited thereto. The angle control mechanism 200 may further include two, four, five or more angle control elements 210. According to an embodiment of the present disclosure, the plurality of angle control elements 210 may have the same structure such that angle control elements 210 may be manufactured by batch, thereby reducing manufacturing cost; this allows for the easy replacement of one or a plurality of angle control elements 210 in the angle control mechanism 200 in the event of damage without having to discard the entire angle control mechanism 200, thereby saving material costs.

Figure 8:
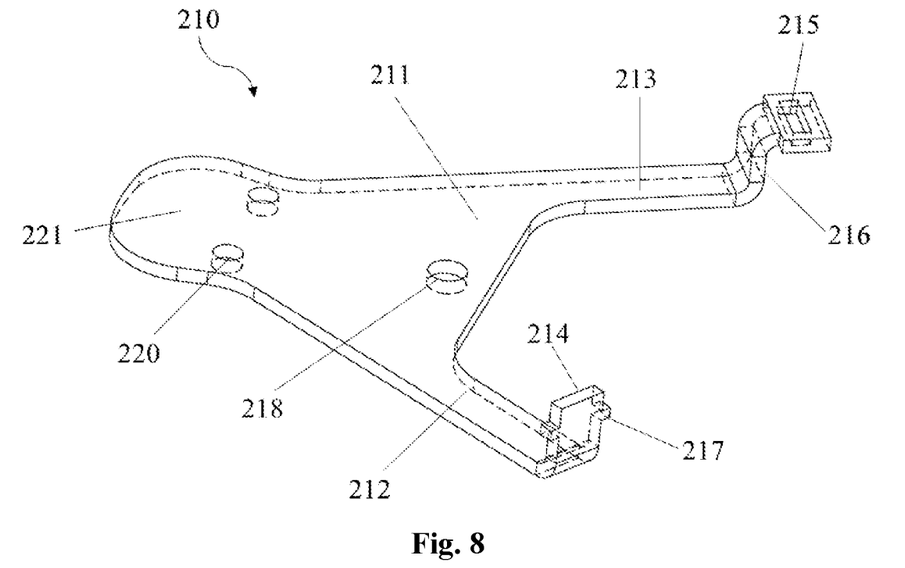
FIG. 8 is a schematic perspective view of a single angle control element of the angle control mechanism shown in FIG. 6.
Figure 9:
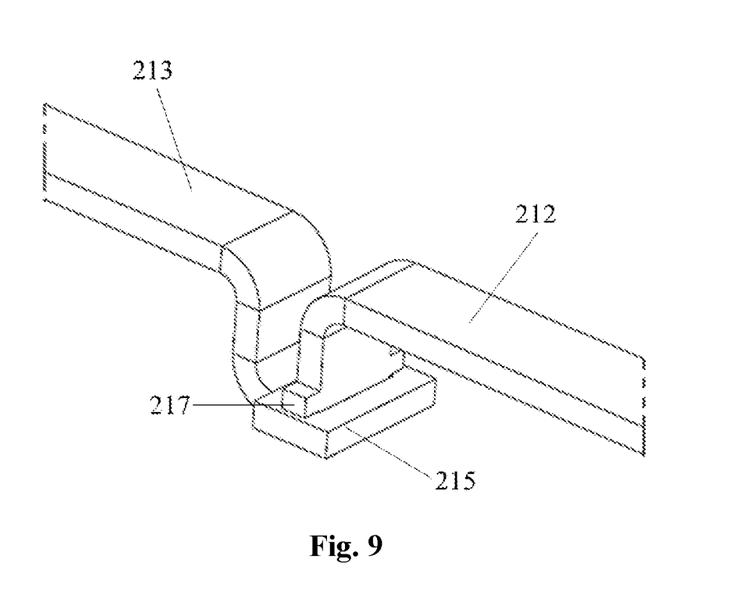
FIG. 9 is a schematic perspective view of the connection between angle control elements shown in FIG. 8.

FIG. 8 shows the specific structure of an angle control element 210 according to an embodiment of the present disclosure. In the embodiment shown in FIG. 8, the angle control element 210 is configured to include a substantially triangular main body 211 and a first leg 212 and second leg 213 that are generally mirror images of each other from two corners of the main body 211 and extend outwards while forming an angle. A free end of the first leg 212 of each angle control element 210 may be provided with an insertion part 214 extending perpendicularly to the first leg 212, and a free end of the second leg 213 of each angle control element 210 may be provided with an opening part 215 compatible for accommodating the insertion part 214 of the first leg 212 of the other angle control element 210. The opening part 215 may be configured to be in a horizontal plane and may be at a different height from the second leg 213. The free end of the second leg 213 may be connected to the opening part 215 through a curved part 216. When the plurality of angle control elements 210 form the angle control mechanism 200, the insertion part 214 of the first leg 212 of an angle control element 210 may be inserted into the opening part 215 of the second leg 213 of another angle control element 210 (as shown in FIG. 9), thereby connecting the plurality of angle control elements 210 by mating the insertion part 214 and opening part 215 (as shown in FIG. 7). According to an embodiment of the present disclosure, the free end of the first leg 212 of each angle control element 210 is further provided with stops 217 for limiting the distance of insertion of the insertion part 214 into the opening part 215. The stops 217 may be configured as a lug protruding outwards from the insertion part 215, as shown in FIG. 8. The plurality of angle control elements 210 according to the present disclosure is capable of being connected together with ease and is also capable of ensuring that the angle control mechanism 200 thereby formed is stable and does not deform easily, thereby ensuring that the plurality of base station antennas 1 are mounted with a precise included angle.

The main body 211 of each angle control element 210 may be further provided with one or a plurality of through holes 218 for the fastening member 130. The fastening member 130 may extend and pass through the through hole 218 of the angle control element 210 and slot 124 of the clamping element 110, thereby fastening the angle control element 210 on the clamping element 110 and fixing the angle control mechanism 200 on the clamping mechanism 100. The main body 211 of each angle control element 210 may be further provided with one or a plurality of fixing members for fixing the mounting mechanism 300. According to an embodiment of the present disclosure, the fixing member may be a through hole 220 used for receiving the fastening member 219. The through hole 220 may be provided near an end 221 of the main body 211 of the angle control element 210. The fastening member 219 may extend through the through hole 220 to fix the mounting mechanism 300 on the angle control element 210, thereby fixing the base station antenna 1 to the entire mounting assembly 10 through the mounting mechanism 300, which will be described in detail below. According to another embodiment of the present disclosure, the fixing member of the angle control element may have other configurations. For example, the fixing member of the angle control element may be configured as a latch member to snap-fit the mounting mechanism 300 and angle control mechanism 200.

In addition, according to other embodiments of the present disclosure, the angle control element 210 may have other different structures, as long as the angle control mechanism 200 formed is capable of controlling the included angle between a plurality of base station antennas 1.

Figure 10:
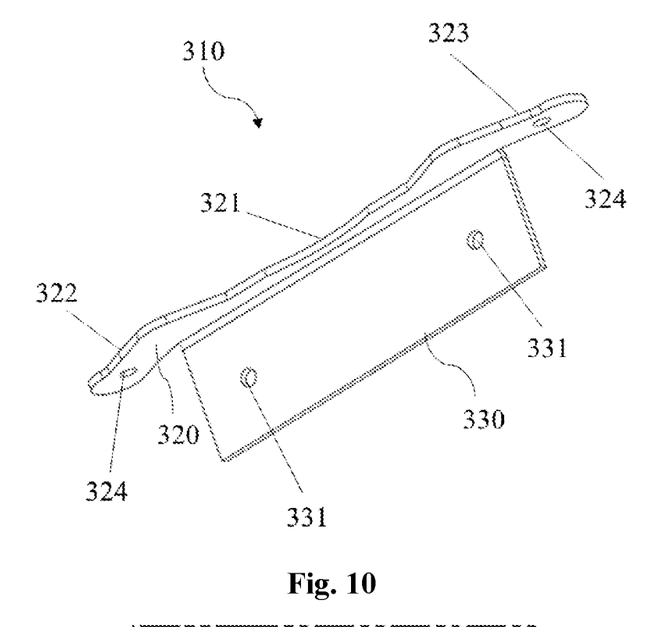
FIG. 10 is a schematic perspective view of a single mounting element of a mounting mechanism of the mounting assembly shown in FIG. 2.

FIG. 2 and FIG. 10 show the specific structure of the mounting mechanism 300 according to an embodiment of the present disclosure. The mounting mechanism 300 may include a plurality of mounting elements 310. According to an embodiment of the present disclosure, the plurality of mounting elements 310 may have the same structure such that the mounting elements 310 may be manufactured by batch, thereby reducing manufacturing cost; this further allows for the easy replacement of one or a plurality of mounting elements 310 in the mounting mechanism 300 in the event of damage without having to discard the entire mounting mechanism 300, thereby saving material costs According to an embodiment of the present disclosure, each mounting element 310 may include a horizontally extending part 320 and vertically extending part 330. The horizontally extending part 320 and vertically extending part 330 may be configured to be essentially perpendicular to each other. The horizontally extending part 320 may include a middle section 321 and a first extending section 322 and second extending section 323 at the left and right sides of the middle section 321. The middle section 321 of the horizontally extending part 320 may be connected to the vertically extending part 330 and the first extending section 322 and second extending section 323 of the horizontally extending part 320 extend beyond the vertically extending part 330 along a horizontal direction.

Each mounting element 310 of the mounting mechanism 300 may be fastened to the angle control mechanism 200. Specifically, the horizontally extending part 320 of each mounting element 310 may be placed on the angle control mechanism 200 such that the vertically extending part 330 is aligned to one edge of the angle control mechanism 200 and depends from this edge, as shown in FIG. 2. The first extending section 322 and second extending section 323 of the horizontally extending part 320 of each mounting element 310 may be respectively provided with a fixing member that matches the fixing element of the angle control element. In the embodiments shown in FIG. 2 and FIG. 10, the fixing member of the mounting element 310 is configured to accommodate one or a plurality of through holes 324 of the fastening member 219. When the horizontally extending part 320 of the mounting element 310 is placed on the angle control mechanism 200, the through hole 324 of the mounting element 310 may be aligned to the through hole 220 of the angle control element 210 of the angle control mechanism 200 such that the fastening member 219 is capable of extending and passing through the through holes for fastening. According to another embodiment of the present disclosure, the fixing member of the mounting element 310 may have other configurations. For example, the fixing member of the mounting element 310 may be a latch member compatible for snap-fitting the angle control element of the angle control mechanism 200.

The vertically extending part 330 of each mounting element 310 is configured to provide a mounting location for fixing the base station antenna 1 thereto. For this, the vertically extending part 330 of each mounting element 310 may be provided with one or a plurality of fixing members. The fixing member may be configured to accommodate a through hole 331 of the fastening member. The fastening member may extend and pass through the through hole 331, thereby fastening the base station antenna 1 to the vertically extending part 330 of the mounting element 310. The fixing member may be further configured as other types of fixing member (for example, latch member) for ease of fixing the base station antenna 1.

Figure 11:
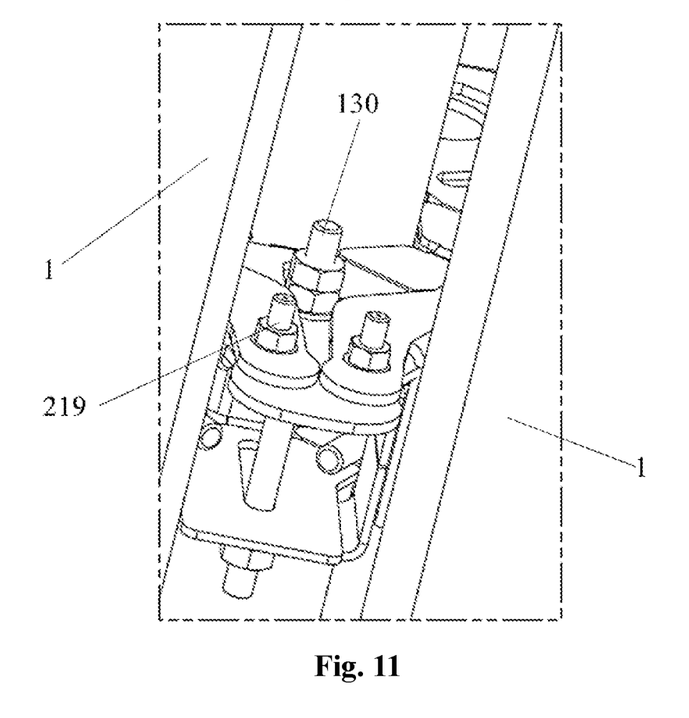
FIG. 11 is a schematic perspective view of the operation space for fastening of the mounting assembly shown in FIG. 2.

In the mounting mechanism 300 according to the present disclosure, as the base station antenna 1 is fixed on the vertically extending part 330 of the mounting element 310 and the fixing member of each mounting element 310 is provided on the first extending section 322 and second extending section 323 extending beyond the vertically extending part 330, the operation space for fastening by operators is shifted to the location between two base station antennas 1 (as shown in FIG. 11). As the operation space between two base station antennas 1 is larger, operators may more easily execute mounting and fastening operations.

Next, the method of mounting a plurality of base station antennas 1 onto a single pole 2 using the mounting assembly 10 according to the present disclosure will be described. The method may include the following steps:

i) pre-clamping the clamping mechanism 100 of the mounting assembly 10 on the pole 2 with a first clamping force;

ii) placing and fastening the angle control mechanism 200 of the mounting assembly 10 on the clamping mechanism 100; in step ii), the locations of the clamping mechanism 100 and/or the plurality of clamping elements 110 forming the clamping mechanism 100 may be adjusted such that the angle control mechanism 200 and the clamping mechanism 100 are aligned through a predetermined method for ease of fastening; in addition, after the clamping mechanism 100 is adjusted and in place, the clamping mechanism 100 may be further fastened such that the clamping mechanism 100 clamps the pole 2 with a second clamping force larger than the first clamping force, thereby fixing the mounting assembly 10 on the pole 2; thus, the interaction between the angle control mechanism 200 and the clamping mechanism 100 can ensure that the clamping mechanism 100 is correctly and accurately positioned;

iii) fixing each base station antenna 1 on the mounting mechanism 300; and iv) placing the mounting mechanism 300 fixed with base station antennas 1 on the angle control mechanism 200 in a manner where it corresponds to the corresponding edge of the angle control mechanism 200.

In steps iii) and iv), a base station antenna 1 may first be fixed on the vertically extending part 330 of a mounting element 310 of the mounting mechanism 300, then the horizontally extending part 320 of the mounting element 310 fixed with base station antennas 1 is placed on the angle control mechanism 200 in a manner where it corresponds to one edge of the angle control mechanism 200. While the horizontally extending part 320 of the mounting element 310 fixed with the base station antenna 1 is placed on the angle control mechanism 200, the mounting mechanism 300 may be snap-fit to the angle control mechanism 200 or after placing the horizontally extending part 320 of the mounting element 310 fixed with the base station antenna 1 on the angle control mechanism 200, the mounting mechanism 300 may be fastened to the angle control mechanism 200 through the fastening member 219.

It must be noted that steps i) to iv) above do not need to be implemented in sequence and may be adjusted or exchanged based on actual needs. In addition, one or a plurality of the above steps i) to iv) may be implemented repeatedly until all base station antennas 1 are mounted on the pole 2. The mounting assembly 10 according to the present disclosure is capable of mounting a plurality of base station antennas 1 on the pole 2 while controlling the angle by using the angle control mechanism 200 and the disassembly and removal of the base station antenna 1 is also very simple, thereby greatly reducing the working hours and workload of operators.

It must also be noted that although the mounting assembly 10 according to the embodiments of the present disclosure is configured to mount a plurality of base station antennas 1 on a single pole 2, the present disclosure is not limited thereto. The mounting assembly 10 according to the present disclosure may also be used in many other technical fields or for mounting any object of other types on a single pole 2.

Exemplary embodiments according to the present disclosure have been described above with reference to the attached drawings. However, those of ordinary skill in the art should understand that various changes and modifications can be made to the exemplary embodiments of the present disclosure without departing from the gist and scope of the present disclosure. All changes and modifications are included in the protection scope of the present disclosure defined by the claims. The present disclosure is defined by the attached claims, and equivalents of these claims are also included.

The invention claimed is:

1. A mounting assembly, the mounting assembly comprising:
a clamping mechanism comprising a plurality of clamping elements configured to fix the mounting assembly on a pole between the clamping elements;
an angle control mechanism having a polygonal configuration defined by a plurality of edges, wherein the angle control mechanism is coupled to an upper surface of the clamping mechanism and controls an angle between a plurality of base station antennas through its polygonal configuration; and
a mounting mechanism configured to mount the plurality of base station antennas by mounting each base station antenna in a manner where it corresponds to an edge of the angle control mechanism, thereby mounting the plurality of base station antennas on the pole at a predetermined angle,
wherein each clamping element is configured to be directly connected to an adjacent clamping element to fix the clamping mechanism on the pole,
wherein an upper surface of each clamping element is provided with a slot for accommodating a fastening member to adjustably fix the angle control mechanism onto the clamping mechanism.

2. The mounting assembly according to claim 1, wherein the clamping mechanism formed by the plurality of clamping elements is adjustable such that the clamping mechanism is capable of clamping poles of different diameters.

3. The mounting assembly according to claim 1, wherein the plurality of clamping elements have the same structure.

4. The mounting assembly according to claim 3, wherein each clamping element includes a first branch, a second branch, and a third branch, and wherein the second branch and third branch are configured to be mirror images of each other from one end of the first branch and extend outward while forming an angle such that each clamping element is generally in a "Y" shape.

5. The mounting assembly according to claim 1, wherein the angle control mechanism has an equilateral triangle, regular quadrilateral, regular pentagon, regular hexagon, or irregular polygonal shape.

6. The mounting assembly according to claim 1, wherein the angle control mechanism includes a plurality of angle control elements.

7. The mounting assembly according to claim 6, wherein the plurality of angle control elements have the same structure.

8. The mounting assembly according to claim 7, wherein each angle control element includes a generally triangular main body, a first leg and a second leg that are mirror images of each other from two corners of the main body and extend outward while forming an angle.

9. The mounting assembly according to claim 1, wherein the mounting mechanism includes a plurality of mounting elements.

10. The mounting assembly according to claim 9, wherein the plurality of mounting elements have the same structure.

11. The mounting assembly according to claim 10, wherein each mounting element includes a horizontally extending part and vertically extending part, and in which the horizontally extending part is configured to overlie the angle control mechanism, and the vertically extending part is configured for fixing the base station antenna.

12. The mounting assembly according to claim 1, wherein the angle control mechanism and mounting mechanism are fastened together with a fastening component.

13. The mounting assembly according to claim 12, wherein the fastening component is a bolt and nut component, the angle control mechanism and mounting mechanism are respectively provided with through holes for accommodating the fastening component, and the through holes are respectively provided on the angle control mechanism and mounting mechanism near the corner away from the mounting location of the base station antenna.

14. The mounting assembly according to claim 1, wherein the angle control mechanism and mounting mechanism are respectively provided with latch members that match each other, and wherein buckle members are respectively provided on the angle control mechanism and mounting mechanism near the corner away from the mounting location of the base station antenna.

15. A mounting assembly configured to mount a plurality of objects on a single pole at a predetermined included angle, the mounting assembly comprising:
a clamping mechanism configured to fix the mounting assembly on the pole, the clamping mechanism including a plurality of clamping elements which fix the clamping mechanism on the pole by clamping the pole between them, each of the plurality of clamping elements having the same structure;
an angle control mechanism having a polygonal configuration defined by a plurality of edges, wherein the angle control mechanism controls an included angle between the plurality of objects through its polygonal configuration; and a mounting mechanism configured to mount the plurality of objects by mounting each object among the plurality of objects in a manner where it corresponds to an edge of the angle control mechanism, thereby mounting the plurality of objects on the pole at the predetermined included angle, wherein each clamping element includes a first branch, a second branch, and a third branch, the second branch and third branch are configured to be mirror images of each other from one end of the first branch and extend outward while forming an angle such that each clamping element is generally in a "Y" shape.

16. A mounting assembly configured to mount a plurality of objects on a single pole at a predetermined angle, the mounting assembly comprising:

a clamping mechanism configured to fix the mounting assembly on the pole by clamping the pole;

an angle control mechanism having a polygonal configuration defined by a plurality of edges, wherein the angle control mechanism controls an included angle between the plurality of objects through its polygonal configuration; and a mounting mechanism configured to mount the plurality of objects by mounting each object among the plurality of objects in a manner where it corresponds to an edge of the angle control mechanism, thereby mounting the plurality of objects on the pole at the predetermined included angle, wherein the angle control mechanism and mounting mechanism are respectively provided with latch members that match each other, and wherein buckle members are respectively provided on the angle control mechanism and mounting mechanism near the corner away from the mounting location of the object.

* * * * *